May 2, 1939.  O. R. SCHEURER  2,156,873
MEASURING AND TROWELING MACHINE
Filed Dec. 27, 1937  2 Sheets—Sheet 1
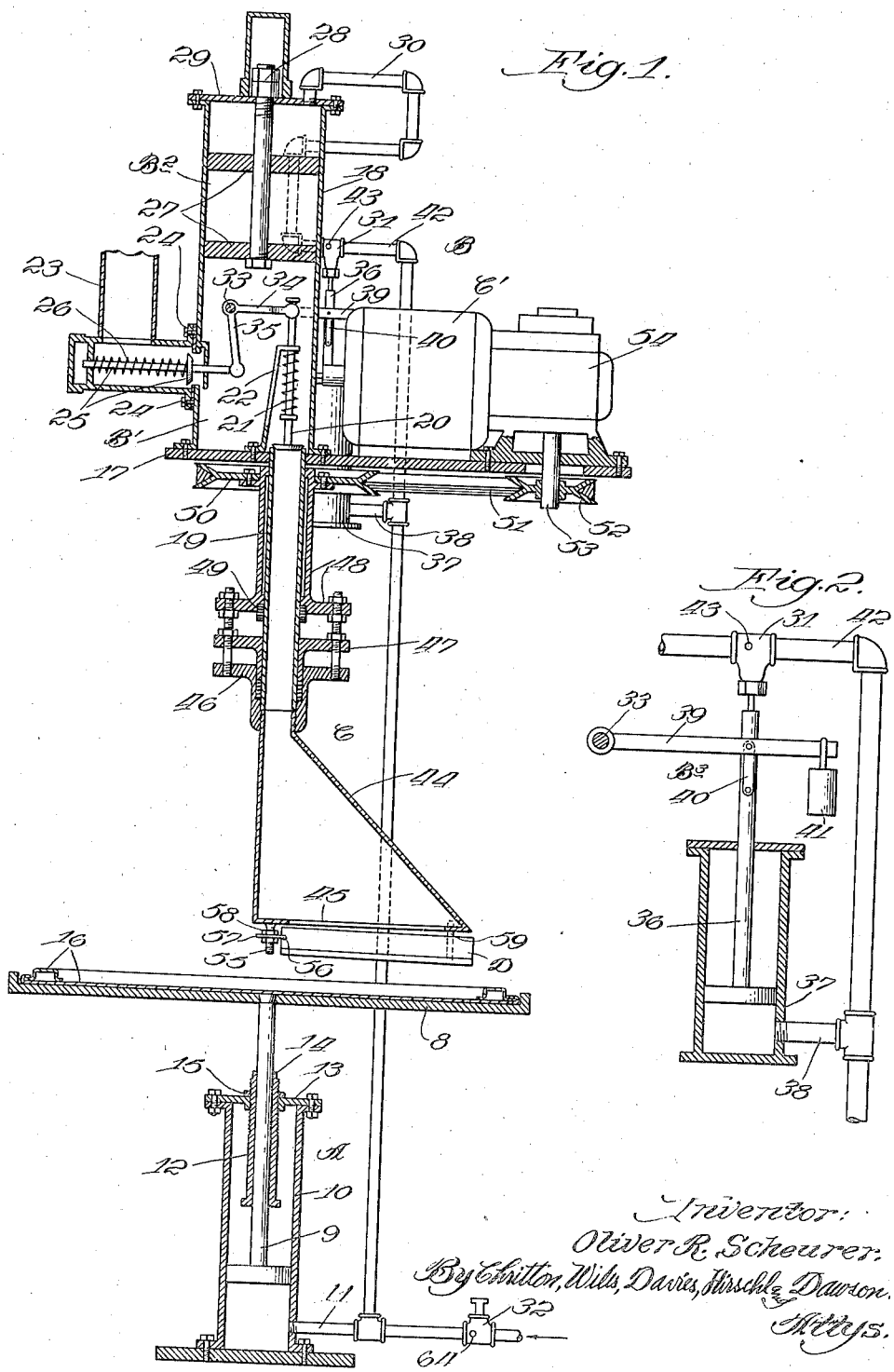

May 2, 1939.   O. R. SCHEURER   2,156,873
MEASURING AND TROWELING MACHINE
Filed Dec. 27, 1937   2 Sheets-Sheet 2
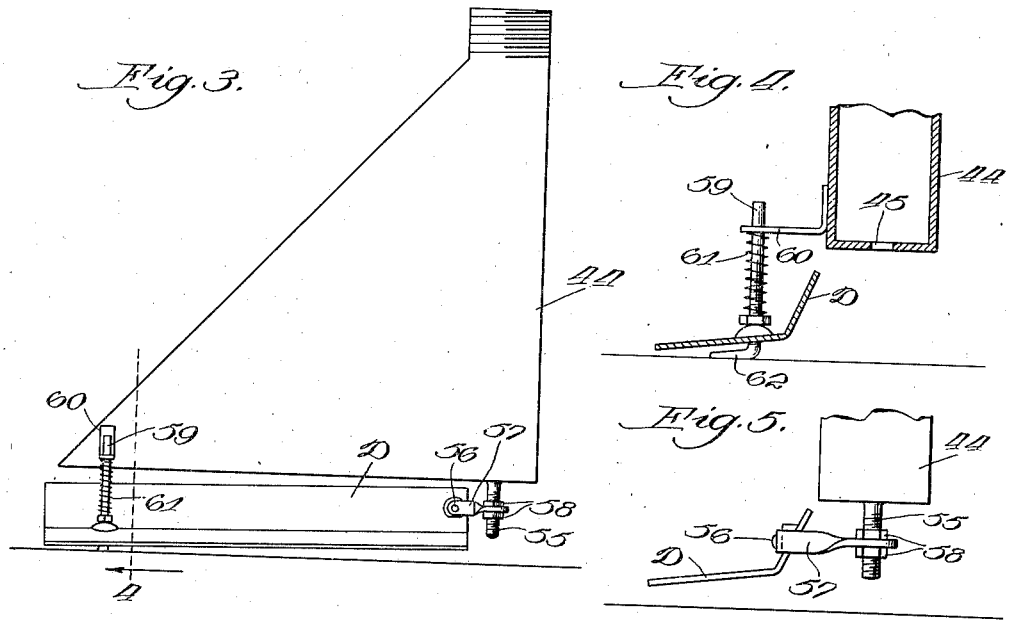
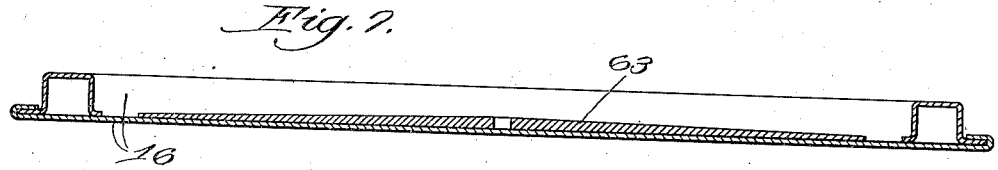
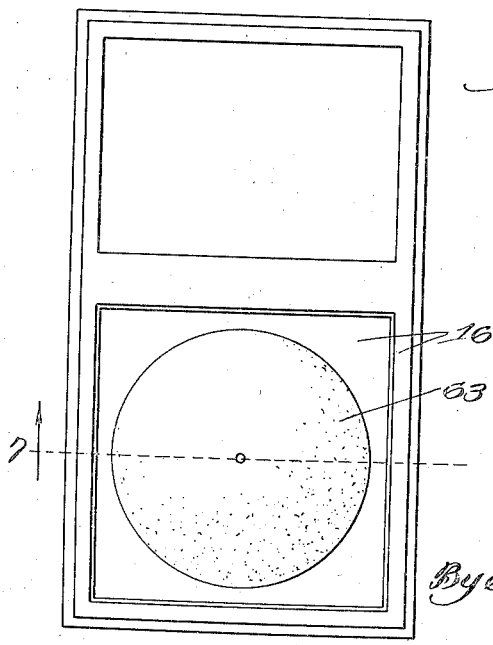
Inventor:
Oliver R. Scheurer.
By Chritton, Wiles, Davies, Hirsch and Dawson.
Attys.

Patented May 2, 1939

2,156,873

UNITED STATES PATENT OFFICE 2,156,873

MEASURING AND TROWELING MACHINE

Oliver R. Scheurer, Kankakee, Ill., assignor to J. W. Mortell Company, a corporation of Illinois Application December 27, 1937, Serial No. 181,982

15 Claims. (Cl. 18—5)

This invention relates to mechanism for applying a measured coating of material to a panel, or the like, and more particularly to a machine for applying a heavy viscous sound-deadening composition to a panel such as a door panel for an automobile, or the like.

The primary object of the invention is to provide an automatic machine for applying quickly and uniformly to a panel, a measured amount of heavy viscous material having an asphalt base, and applying material in the form of a circular patch which is somewhat thicker at its central portion than at its edge portions.

A further object of the invention is to provide a panel-supporting table which automatically raises the work to the proper position to receive the sound-deadening material.

A further object of the invention is to provide improved mechanism for troweling material.

The invention is illustrated in a preferred embodiment in the accompanying drawings, in which:

Figure 1 is a broken sectional view of a machine embodying the invention; Fig. 2, a fragmentary sectional view of the pneumatic plunger mechanism for automatically operating the valves which control the sound-deadening material before the material is extruded from the machine; Fig. 3, an elevational view of the rotary distributing device with the troweling-blade attached; Fig. 4, a fragmentary sectional view, taken as indicated at line 4 of Fig. 3; Fig. 5, a broken end elevational view of the same; Fig. 6, an elevational view of a door panel after the sound-deadening material has been applied; and Fig. 7, a sectional view, taken as indicated at line 7 of Fig. 6.

In the embodiment illustrated, A designates a work-supporting table; B, extrusion mechanism including a valve chamber B', a pneumatic plunger B², and valve operating mechanism B³; C, rotary distributing mechanism adapted to be driven by motor C'; and D, troweling-mechanism.

The panel-supporting table A is shown with a movable supporting plate 8 which is mounted on a pneumatic plunger 9 adapted to reciprocate in a pneumatic pressure cylinder 10 which is connected to an air pressure line 11. The upward travel of the plate 8 is adjustably limited by a spacing sleeve 12 which makes a threaded connection with a cylinder head 13, as shown in Fig. 1. The upper end of the sleeve 12 is of reduced diameter, as indicated at 14, to receive a wrench for adjustment purposes. A locking nut 15 serves to lock the sleeve 12 in adjusted position. The base to be worked upon, such as automobile door panels 16, fit on the plate 8 and may be moved onto and off of the table manually or by suitable conveyer means (not shown) when the table is in its lower position.

The measuring and extruding device B preferably is mounted on a fixed supporting plate 17 and is provided with a pneumatic plunger cylinder 18 whose lower portion B' has been referred to as a valve chamber. A fixed pipe 19 is secured to the plate 17 and extends upwardly into the bottom of the cylinder 18. An outlet valve 20 controls the opening to the pipe 19 and is urged downwardly into closed position by means of a compression spring 21 bearing against a guide-member 22.

A material supply line 23 is bolted to the side wall of the cylinder 18, as indicated at 24, and the communicating opening is controlled by an inlet valve 25 which is urged to closed position by a compresion spring 26 in circling the valve stem.

In the upper portion of the cylinder 18 is provided a plunger 27 the stroke of which is adjustable by means of a pair of nuts 28 provided on the piston rod which extends through the cylinder head 29. The plunger may be forced downwardly to the limit of a stroke by means of air supplied through the pressure line 30 which is controlled by valves 31 and 32. The sound-deadening material which is heavy and viscous enters the valve chamber through the pipe 23 at a pressure between fifty and seventy-five pounds per square inch when the valve 25 is opened. This pressure forces the plunger 27 upwardly when the air in the line 30 is shut off and permits a measured amount of material to enter the cylinder 18.

As shown in Figs. 1 and 2, the inlet valve 25 and outlet valve 20 are opened and closed alternately by means of the mechanism B³ which includes rock shaft 33 provided with arms 34 and 35 within the cylinder 18. As best shown in Fig. 2, the rock shaft 33 is operated by means of a pneumatic plunger 36 which operates in a cylinder 37 under the influence of pressure from the air line 38. The rock shaft 33 has an arm 39 which is linked to the plunger 36 by means of a pitman 40. The end of the arm 39 is shown provided with a weight 41 which augments the force of gravity to shut off air to the plunger 27 through the valve 31 and to open the inlet valve 25 while permitting the outlet valve 20 to close under the influence of spring 22. The valve 31 is of standard construction and need not be described in detail. Downward movement of the plunger 36 shuts off air to the cylinder 18 from the supply line 42 and opens a port 43 which permits air from the cylinder 18 to escape while the plunger 27 is being forced upwardly by the incoming material. On the other hand, upward movement of the plunger 36 shuts off the port 43 and permits air from the pressure line 42 to enter the cylinder with a pressure from fifty to seventy-five pounds per square inch. The act of opening the valve 31 to admit air to the cylinder closes valve 25 and opens the valve 20 so that a measured amount of material in the cylinder 18 will be extruded through the fixed hollow shaft 19.

The distributing device C comprises a hollow fish-tail member 44 whose bottom side is slotted, as indicated at 45, to permit the sound-deadening material to be extruded therethrough onto the base of the panel 16. The upper end of the member 44 makes a threaded connection with a flanged member 46 which is journalled on the shaft 19 and is provided with an adjustable stuffing box 47. The member 46 is bolted to a bearing 48 which is supported on a fixed flange 49 secured to the shaft 19. The upper end of the bearing member 48 is provided with a sheave 50 which is driven by a belt 51, and by a sheave 52 provided on a shaft 53. A speed-reduction gear box 54 is provided to drive the shaft 53 from the motor C′ and preferably serves to rotate the member 44 at about 46 R. P. M. The member 44 rotates constantly and need not be shut off while fresh material is entering the valve chamber and a new panel 16 is being moved into position.

On the lower end of the member 44 is a threaded pivot finger 55 about which the distributing device rotates and which serves to limit the upward travel of the panel 16. The troweling-blade, as shown in Figs. 3–5, is in the form of an obtuse angular member having one end pivoted at 56 to the finger 55 by means of a bracket 57 adjustably secured to the finger 55 by means of nuts 58. The opposite end of the troweling-blade D is provided with a vertically extending guide rod 59 which extends through a guide bracket 60 provided on the member 44. A compression spring 61 urges the outer end of the troweling-blade downwardly and the lower end of the rod 59 is provided with a foot 62 adapted to ride on the face of the panel 16.

Preferably the troweling-blade D is adjusted so that in applying a patch 63 of sound-deadening material of sixteen inches in diameter, the patch will be about three-eighths of an inch thick at the center and about one-eighth of an inch thick at its marginal edge portions. This arrangement has proven to give the best sound-deadening results with a given weight of material.

The sound-deadening materials, which usually have an emulsified asphalt base, may vary considerably in viscosity. As indicated above, it is preferred to operate the machine at about 46 R. P. M. Two revolutions of the troweling-device are sufficient to satisfactorily apply a sound-deadening material of rather thin consistency. If the sound-deadening material is very thick, five or six revolutions of the troweling-blade are desirable.

As will be readily understood, the operation of the machine may be entirely controlled by the valve 32. A panel 16 which is to receive a sound-deadening patch, is placed on the table 8 and the valve 32 is opened to admit high pressure air to the cylinders 10, 37, and 18 through pipe lines 11, 38, and 30, respectively. The air in cylinder 10 forces the plunger 9 upwardly and brings the work into position to receive the application of sound-deadening material. At the same time air from the pipe 38 forces the plunger 36 upwardly, closing the valve 25, opening the valve 20, and opening the valve 31. The plunger 27 will then be forced downwardly and will extrude a measured amount of material through the constantly rotating distributor head 44 onto the panel 16 where it will be troweled by the blade D. The valve 32 is then shut off and the pressure in the system relieved by a bleeder vent 64 which will permit the table 8 to be lowered, the valve 20 to be closed, the valve 25 to be opened, and the plunger 27 forced upwardly by the incoming material.

The foregoing detailed description has been given for clearness of understanding only, and no unnecessary limitations should be understood therefrom, but the appended claims should be construed as broadly as permissible, in view of the prior art.

I claim:

1. A device of the character set forth, comprising: a hollow shaft provided at one end with a troweling-blade; measuring means for extruding a regulated amount of viscous material through said shaft during each operation of the device to a position adjacent to said blade; and means for rotating said blade to distribute and trowel said material.

2. A device as specified in claim 1, in which the shaft is disposed vertically and the lower end of the shaft rotates with the troweling-blade, a portion of said blade being yieldingly mounted on said shaft for limited vertical movement with respect thereto.

3. A device of the character set forth, comprising: a hollow shaft provided at one end with a troweling-blade; a valve chamber communicating with said hollow shaft; plunger mechanism for extruding a measured amount of material through said valve chamber and shaft to a position adjacent to said blade during each operation of the device; and means for rotating said blade to distribute and trowel said material.

4. A device as specified in claim 3, in which the valve chamber is equipped with an inlet valve to a supply pipe and an outlet valve to the hollow shaft, said valves having springs urging them to closed position, and mechanical means for opening said valves alternately.

5. A device for the purpose set forth, comprising: a measuring device; a fixed hollow vertically disposed shaft depending from said device; a distributing device journalled on said shaft and having at its lower end a troweling-blade; said measuring device having a plunger for extruding a measured amount of viscous material from said distributing device during each stroke of the plunger; and driving-means for rotating said distributing device with respect to said shaft.

6. A device as specified in claim 5, in which the distributing device encloses and is supported by the fixed shaft, said device being provided with a sheave and belt adapted to be driven by an electric motor through a speed-reducing mechanism.

7. A device as specified in claim 5, in which the troweling-blade is hingedly mounted on the distributing device and has a free end provided with a guide-member adapted to ride upon the object worked upon, and a spring disposed so as to urge the free end below the pivoted end.

8. A machine for the purpose set forth, comprising: a panel supporting table; a troweling device disposed above said table comprising a hollow rotating shaft provided at its lower end with a troweling-blade, and plunger-mechanism for extruding a measured amount of viscous material through said shaft onto a panel on said table; and fluid pressure-means for lifting said table sufficiently to bring the panel into contact with the troweling-blade, and for operating said extruding plunger.

9. A device as specified in claim 8, in which the troweling machine has a valve chamber communicating with said hollow shaft, said chamber has a spring closed inlet valve and a spring closed outlet valve to said shaft, mechanism is provided for opening said valves alternately, and said mechanism is operated automatically by the fluid pressure-means.

10. A machine for the purpose set forth, comprising: a panel supporting table; a troweling device disposed above said table comprising a hollow rotating shaft provided at its lower end with a troweling-blade; a valve chamber provided with a spring closed inlet valve to a supply pipe of material under pressure and a spring closed outlet valve to said shaft, mechanism for opening said valves alternately, and a plunger for extruding a measured amount of viscous material into the shaft from said chamber; and pneumatic pressure-means for operating said valve mechanism and plunger.

11. A device as specified in claim 10, in which the pressure-means is provided with a control valve for applying and releasing pneumatic pressure to the system manually, said means being arranged so that the application of pneumatic pressure to the system will close the inlet valve, open the outlet valve, and force the plunger to extrude material from the chamber while release of the pneumatic pressure will close the outlet valve, open the inlet valve and permit the pressure of the incoming material to retract said plunger.

12. A machine for the purpose set forth, comprising: a panel supporting table; a troweling-device disposed above said table comprising a hollow rotating shaft provided at its lower end with a troweling-blade; a valve chamber provided with a spring closed inlet valve to a supply pipe of material under pressure and a spring closed outlet valve to said shaft, mechanism for opening said valves alternately, and a plunger for extruding a measured amount of viscous material into the shaft from said chamber; an air lift for raising the table sufficiently to bring a superposed panel into contact with the troweling-blade; and pneumatic pressure-means for operating said valve mechanism, plunger and air lift.

13. A device as specified in claim 12, in which the troweling-device is provided at its lowermost end with a centrally disposed pivot finger adapted to engage the panel and limit the upper travel of the table.

14. A device as specified in claim 12, in which an auxiliary valve is provided for delaying the application of pressure to the plunger until the valve mechanism has operated to open the outlet valve.

15. A device as specified in claim 12, in which an auxiliary valve is provided for delaying the application of pressure to the plunger until the valve mechanism has operated to open the outlet valve, and a pneumatically operable plunger has a cylinder connected to the pressure-means to operate said valve mechanism and auxiliary valve.

OLIVER R. SCHEURER.